United States Patent [19]
Hull et al.

[11] Patent Number: 5,447,822
[45] Date of Patent: Sep. 5, 1995

[54] APPARATUS AND RELATED METHOD FOR FORMING A SUBSTANTIALLY FLAT STEREOLITHOGRAPHIC WORKING SURFACE

[75] Inventors: Charles W. Hull, Santa Clarita; Adam L. Cohen, Sherman Oaks; Stuart L. Spence, S. Pasadena; Charles W. Lewis, Sherman Oaks, all of Calif.

[73] Assignee: 3D Systems, Inc., Valencia, Calif.

[21] Appl. No.: 230,443

[22] Filed: Apr. 20, 1994

Related U.S. Application Data

[63] Continuation of Ser. No. 26,620, Mar. 4, 1993, abandoned, which is a continuation of Ser. No. 414,200, Sep. 28, 1989, abandoned.

[51] Int. Cl.[6] .................... B05D 3/06; G03C 9/08
[52] U.S. Cl. .................... 430/269; 264/401; 425/174.4; 427/487; 427/492
[58] Field of Search .................... 430/269; 264/22; 425/174.4; 427/487, 492

[56] References Cited

U.S. PATENT DOCUMENTS

| | | | |
|---|---|---|---|
| 4,356,216 | 10/1982 | Gailey et al. | 427/286 |
| 4,356,217 | 10/1982 | Wollam et al. | 427/286 |
| 4,387,123 | 6/1983 | Wollam et al. | 427/286 |
| 4,424,089 | 1/1984 | Sullivan | 430/270 X |
| 4,575,330 | 3/1986 | Hull | 425/174.4 |
| 4,698,284 | 10/1987 | Cronin | 430/311 X |
| 4,752,498 | 6/1988 | Fudim | 427/54.1 |
| 4,929,402 | 5/1990 | Hull | 264/22 |
| 5,143,817 | 9/1992 | Lawton et al. | 430/269 |

FOREIGN PATENT DOCUMENTS

| | | | |
|---|---|---|---|
| 48210 | 11/1981 | Japan . | |
| WO9003225 | 4/1990 | WIPO | 264/22 |

OTHER PUBLICATIONS

E. Ostroff, ED., "Pioneers of Photography", SPSE, 1987.

G. L. Booth, "Coating Equipment and Processes", Lockwood Publishing Co., 1970.

G F. Duffin, "Photographic Emulsions", Focal Press, 1966.

E. I. Cooke and R. W. I. Cooke, Eds., "Handbook of Chemical Synonyms and Tradenames", CRC, 1978, pp. 482,588,682,761, and 763.

Automatic method for fabricating a three-dimensional plastic model with photo-hardening polymer by Hideo Kodama pulbished in the "Review of Scientific Instruments" Nov. 1981.

Kodama A scheme for Three-Dimensional Display by Automatic Fabrication of Three-Dimensional Model by Hideo Kodama published in Trans. IECE '81/4 vol. J64–C No. 4.

*Primary Examiner*—Mark A. Chapman
*Attorney, Agent, or Firm*—Dennis R. Smalley

[57] ABSTRACT

An apparatus and related method for providing a substantially flat working surface of photocurable resin for the formation of a next layer of a stereolithographic part. A substantially flat surface of a rigid member is substantially covered by and spaced from the resin by a substance or film, which is placed in contact with the photocurable resin to form the working surface. Various embodiments are described including where the rigid member is a quartz including a fused silica plate, a bar, a vat wall, the face of a CRT, a fiber-optic bundle, or the bottom of a piston, and also including embodiments where the substance or film is a thin teflon or mylar film, an inert liquid, wax, a thin coating of trichlorosilane or ethoxysilane, or oxygen-saturated resin. Embodiments are also described whereby the next layer is exposed by transmitting solidifying radiation through the member and substance or film.

31 Claims, 10 Drawing Sheets

APPARATUS AND RELATED METHOD FOR FORMING A SUBSTANTIALLY FLAT STEREOLITHOGRAPHIC WORKING SURFACE

This is a continuation of application Ser. No. 08/026,620 filed on Mar. 4, 1993 now abandoned which is a continuation of application Ser. No. 07/414,200, filed on Sep. 28, 1989 and which designated the U.S., abandoned.

BACKGROUND OF THE INVENTION

I. Field of the Invention

This invention relates generally to the field of stereolithography, and more specifically, to an apparatus and related method for rapidly providing a flat working surface of photocurable resin for the formation of a layer of a multi-layer stereolithographic part.

II. Background

Stereolithography is a process for building up a reproduction of an object layer by layer such that the layers are sequentially formed and adhered to adjacent layers until the overall reproduction is complete. The stereolithographic reproduction is commonly referred to as a stereolithographic part, or more simply, part. This process is described in more detail in U.S. Pat. No. 4,575,330, entitled "APPARATUS FOR PRODUCTION OF THREE-DIMENSIONAL OBJECTS BY STEREOLITHOGRAPHY," by Charles W. Hull, which issued Mar. 11, 1986, and which is hereby fully incorporated by reference herein as though set forth in full. As described in that patent, a stereolithographic apparatus ("SLA") is an apparatus for producing an object through the process of stereolithography. Furthermore as described in that patent, stereolithography is a method and apparatus for making solid objects by successively "printing thin layers of a curable material, e.g., a UV curable material, one on top of the other. An embodiment of an SLA comprises synergistic stimulating means such as a UV laser or the like, photocurable liquid resin, and elevator means. This embodiment of the SLA forms each layer of the part by tracing each layer on a surface of the resin typically referred to as the designated working surface, or more simply, working surface. The layer is traced at an intensity and time sufficient to cure the liquid resin to a predetermined thickness extending beyond the designated working surface.

For further details of stereolithography, reference is made to U.S. Pat. No. 4,575,330 the following U.S. patents and pending U.S. and patent applications which are incorporated herein by reference in their entirety, including appendices attached thereto or material incorporated therein by reference, as if fully set forth:

U.S. Pat. No. 5,104,592;

U.S. patent application Ser. No. 331,644, filed Mar. 31, 1989, entitled "METHOD AND APPARATUS FOR PRODUCTION OF HIGH RESOLUTION THREE-DIMENSIONAL OBJECTS BY STEREOLITHOGRAPHY";

U.S. Pat. No. 5,015,424;
U.S. Pat. No. 4,999,143;
U.S. Pat. No. 5,076,974;
U.S. Pat. No. 5,058,988;
U.S. Pat. No. 5,059,021;
U.S. Pat. No. 5,123,734;

U.S. patent application Ser. No. 365,444, filed Jun. 12, 1989, entitled "INTEGRATED STEREOLITHOGRAPHY".

The part is built on and supported by a platform, which is integral with the elevator means as it is being built up. The elevator means can either raise or lower the platform. Typically, the first layer does not adhere directly to the platform, but instead adheres to supports, which are built up from curing the liquid resin, and which in turn, adhere to the platform.

Subsequently formed layers are then cured such that they adhere to a preceding layer while they are being cured. As the part is being built up, the elevator means progressively moves the already cured layers away from the designated working surface. At each step throughout the build-up of the part, after a layer has been formed, the elevator means moves that layer (along with all the other formed layers) away from the working surface so that fresh liquid resin, which will be used to form the next layer, flows over the previous layer. This step, whereby the liquid resin is caused to flow over the previous layer, is typically known as the recoating step.

Typically, the next layer will have a predetermined thickness, and to speed up the flow of fresh resin over the previous layer, the elevator means will move the just-cured layer away from the working surface by more than the predetermined thickness. If the previous layer were only moved by the predetermined thickness, the surface tension and viscosity of the resin may prevent it from flowing rapidly over the previous layer. Then, in preparation for curing the next layer, the previous layer is moved to the predetermined thickness of the working surface ensuring that the next layer will adhere to it after curing. This step of moving the previous layer away from the working surface by more than the predetermined thickness, and then moving it to the predetermined thickness, is typically referred to as over-dipping.

The liquid resins used are typically highly viscous, preferably having a viscosity as small as possible, which may be about 100 centipoise, and which typically ranges from between about 1000 to about 6000 centipoise.

As a result, during the recoating step, the resin may require an inordinate amount of time to flow over a previous layer and level out leaving an appropriate coating of resin over the previous layer in preparation for building the next layer, even where over-dipping is practiced. This may introduce distortions into the final part. This problem is particularly acute in the case where the stereolithographic part is comprised of many layers, since, in this instance, any delay in recoating would occur at each layer in the formation of the part, and therefore accumulate into a significant total delay. A third problem is that the resin may be so viscous and have too much surface tension that it will not settle into thin layers, which limits the final resolution of the part. With some current resin formulations, for example, layers thinner than about 5 mils may not be possible.

An approach which has been utilized to speed up the leveling of the liquid resin is the use of a blade known as a doctor or leveling blade to sweep over the resin surface, and scrape or push off excess resin to form a flat working surface. Blade recoating is, however, strongly dependant on part geometry. For certain geometries, for example, a particular blade speed may be too fast, so that too much resin is swept away by the blade, while for other geometries, this speed may be too slow to sweep away excess resin from the working surface. Instead, this resin may simply flow underneath the blade. Besides blade speed, other recoating parameters may have to be balanced depending on part geometry, including the number of passes made by the blade for a given layer, the speed of the blade at each pass, the part to blade clearance at each pass, the gap between the blade and the working surface, and the blade configuration.

It may be possible to recoat a given layer in a manner which is less dependent on part geometry. According to this approach, a given layer is recoated through more than one sweep of the doctor blade. However, such an approach can be time consuming in part because of the multiplicity of sweeps at each layer.

Another approach for forming a flat working surface may be the placement of a flat, rigid, and possibly transparent member in contact with the liquid resin such that the interface between the member and the resin forms the working surface for the formation of the next layer. This approach, however, is difficult to employ in the course of building up a multi-layer stereolithographic part, since the contact between the member and the resin may have to be broken periodically, typically for each layer of the part, to allow fresh liquid resin to flow over the working surface in preparation for curing additional layers. This can cause damage to the part.

In the case where the member is left in place while the resin at the working surface is cured to form a particular layer, the cured resin will bond to the member. When the member is removed from the cured resin so that fresh liquid resin may flow across the working surface in preparation for forming the next layer, the cured resin may stick to the member, and removal may be difficult even with the use of release agents. Moreover, cured resin adhering to the member may also cause the part to break, tear, or be dislocated as separation is attempted.

In the case where the member is removed before the resin at the working surface is cured to form a particular layer, liquid resin from the working surface may still stick to the member when it is removed, even with the use of release agents, thereby interfering with formation of a smooth working surface.

Accordingly, it is an object of the present invention to provide an apparatus and related method for rapidly providing a substantially flat working surface of photocurable resin for the formation of a multi-layer stereolithographic part, which apparatus and related method is substantially independent of part geometry, and which minimizes any distortive effects therefrom on the part.

SUMMARY OF INVENTION

To achieve the foregoing objects, and in accordance with the purpose of the invention as embodied and broadly described herein, there is provided an apparatus for providing a substantially flat working surface of photocurable resin for the formation of a layer of a stereolithographic part, which layer is formed when the photocurable resin at the working surface is subjected to solidifying radiation, comprising a rigid member having a substantially flat surface and an edge which forms a corner with said surface; a film which substantially covers said member surface and which has an end wrapped around the corner to substantially cover the member edge; means for sliding the covered member surface along a resin surface having excess resin and pushing away the excess resin with the covered member edge thereby forming the substantially flat working surface at the resin surface; means for retracting the member away from the working surface; and tension means coupled to the film end for peeling the film adjacent to the member corner off the resin surface while the member is being retracted.

A related method is also provided.

DESCRIPTION OF EXEMPLARY EMBODIMENTS

Figure 1:
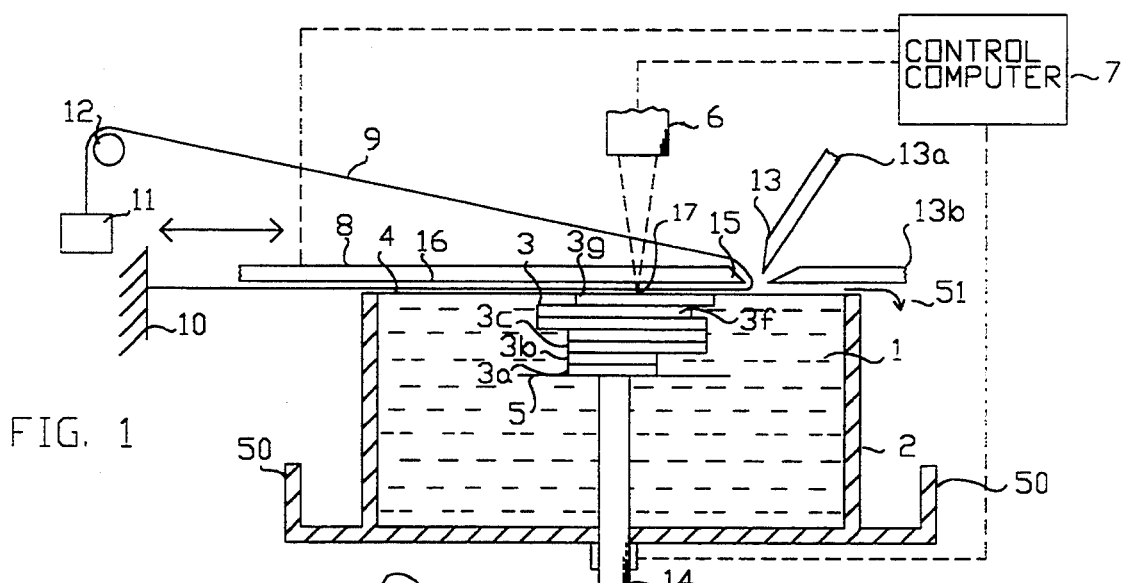
FIG. 1 is a cross-sectional view of an embodiment of the subject invention where the covering substance is a thin film.
Figure 2:
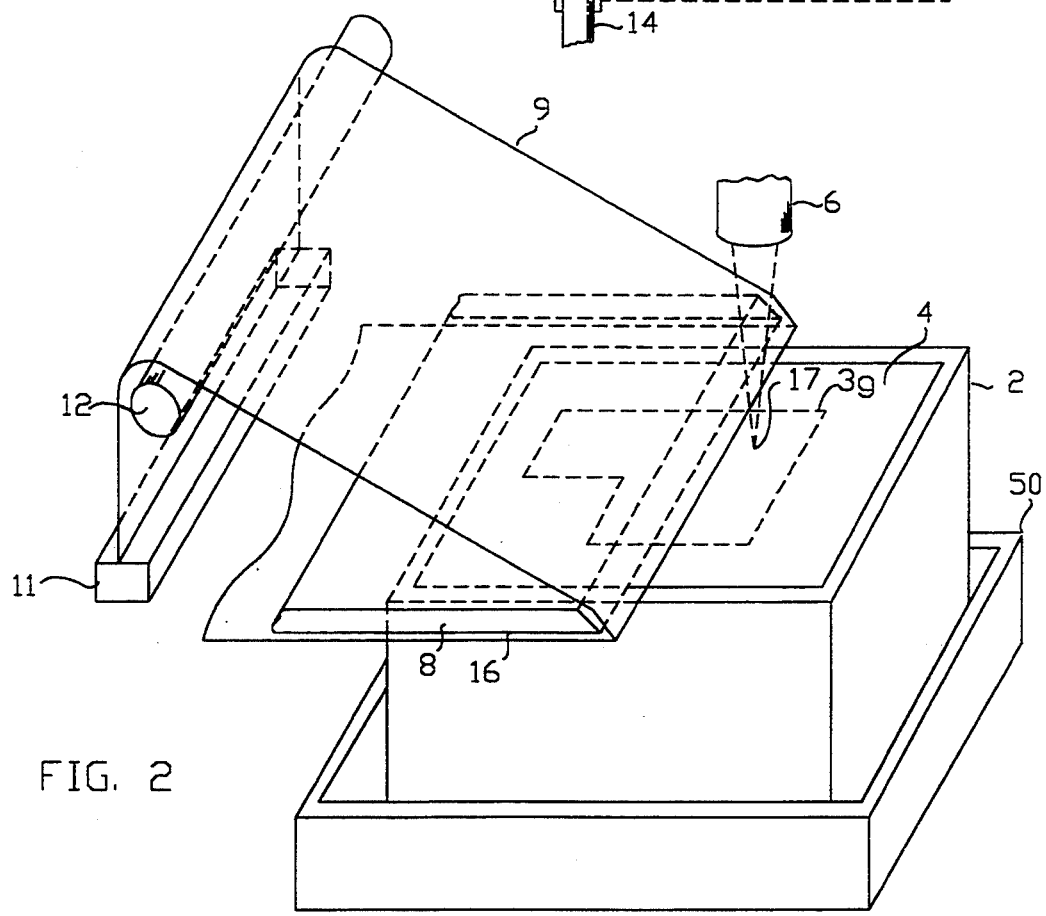
FIG. 2 is a perspective view of the embodiment of FIG. 1.

A cross-sectional and perspective view of an exemplary embodiment of the subject invention is illustrated in FIGS. 1 and 2, respectively, in which like elements are identified with like reference numerals. As illustrated, photocurable resin 1 is provided in a vat 2, and stereolithographic part 3 is built up layer by layer at working surface 4 of the resin. The part, as it is being built up, is supported by platform 5 which is integrally coupled to elevator 14. Successive layers of the part are identified with reference numerals 3a, 3b, 3c. The individual layers are formed by directing UV light source 6 to trace out and form the layers at working surface 4. The UV light source produces a UV beam which impinges upon the working surface at point 17.

As illustrated, the elevator and the UV light source are under the control of control computer 7. The control computer directs the UV light source to trace out and cure a layer, and then directs the elevator to lower the platform (and the layer) below the working surface so that fresh resin will flow over the layer, which will be used to form a next layer. The just-formed layer becomes the previous layer. The previous and next layers are identified with reference numbers 3f and 3g respectively. The next layer has a predetermined thickness, and the control computer will ensure that the previous layer is placed at a distance from the working surface equal to the next desired layer thickness. The next layer is given a specified exposure equal to or slightly greater than the desired layer thickness to ensure it will adhere to the previous layer.

Also shown is movable rigid plate 8 having a flat surface 16, and edge 15, and thin film 9 which is fixed at one end to stationary point 10. The plate is movable horizontally across the resin surface as shown. This end of the film 10 is positioned underneath and around edge 15 of the plate and then over the top of the plate, and around rotatable dowel 12, whereupon it is fixed to weight 11 or other tension source such as a motor. As a result, the film substantially covers surface 16 of the rigid plate, ensuring that the plate will not come in contact with the resin. As the plate is retracted from the working surface of the resin, the force of the gravity on the weight will take up any slack in the film, keeping it taut against surface 16 and edge 15 of the rigid plate. The force exerted by the weight on the film will cause it to bend relatively sharply around edge 15, which in turn results in a minimal force keeping the film and resin together at the point where the film bends sharply around the plate. As a result, as the plate is moved back, the film is peeled off the resin surface.

The film is preferably a thin film having a thickness in the range of about $\frac{1}{2}$ to 5 mils, and preferably 2 mils. It is preferably comprised of a material which does not stick well to either the uncured or cured resin, such as material from the group consisting of epoxy, mylar, teflon, or the like. The plate material is preferably a rigid material having a flat surface. It may or may not be transparent to the solidifying radiation depending on the embodiment. The flatness of the plate surface is substantially determinative of the flatness of the working surface, and therefore, should be as flat as desired for that surface. Moreover, the desired flatness may depend on the layer thickness. For 20 mil layers, for example, a surface which is flat to within about ±3 mils may be appropriate, while for a 5 mil layer thickness, a surface which is flat to within about ±1 mil may be appropriate.

Exposure of layers can optionally take place through the plate and film, while the plate and film are in contact with the resin defining the working surface. Alternatively, the plate can be retracted before exposure of the next layer. If exposure is to take place through the plate material (and film), the plate material (and film) should be substantially transparent to the synergistic stimulation being used to cure the resin. In the case of UV laser light, for example, a substrate made from quartz including fused silica or the like, even PYREX, or glass may be appropriate depending on the particular wavelengths involved and the efficiency desired. Regarding the film, the film should be thin enough so that it is substantially transparent to UV light. In the case of an epoxy, MYLAR or TEFLON film, a film having a thickness in the range of $\frac{1}{2}$ to 5 mils, as recommended above, is appropriate.

Optionally, scrapers, an air blade, or other appropriate means for additionally preventing excess liquid resin or solidified resin from adhering to the film when the film is being peeled off the resin may be provided. In FIG. 1, air blade 13 is optionally provided to prevent resin from sticking to film 9. As shown, the air blade includes individual blades 13a and 13b which form a wedge for directing a pressurized flow of air towards end 15 of the substrate. Preferably, the scrapers or air blade should always be maintained at a given separation from the plate. As a result, any resin sticking to the film may be forced back into the vat by the air blade. Additional details about air blades can be found in Booth, George L., "Coating Equipment and Processes," Lockwood Publishing Co. (1970), Duffin, George F., "Photographic Emulsions," Focal Press (1966), and "Pioneers of Photography," Eugene Ostroff Ed., SPSE (1987), all of which are hereby fully incorporated by reference herein as though set forth in full.

Also shown in FIGS. 1 and 2 is reservoir 50 for capturing excess resin which may flow over the sides of the vat when the covered plate is first moved across the resin surface. This flow is represented in FIG. 1 by means of identifying numeral 51.

A pump, plunger, and level detecting system may also be provided (not shown) in the embodiments of FIGS. 1 and 2 to ensure that the rigid plate and film will touch the liquid surface and thereby set the working surface. The pump and plunger would be responsive to the level detecting system, and the pump would be coupled to a source of fresh resin. The level detecting system would detect and measure the liquid resin level, and compare it with a predetermined level, chosen to ensure enough contact between the plate/film and the liquid resin. If the resin level is below the predetermined level, the level detecting system would direct the plunger to lower itself into the resin until the resin level were at or above the predetermined level. If the plunger could not be lowered any further, the level detecting system would direct the pump to pump additional resin into the vat until the resin level were at or above the predetermined level.

Figure 3:
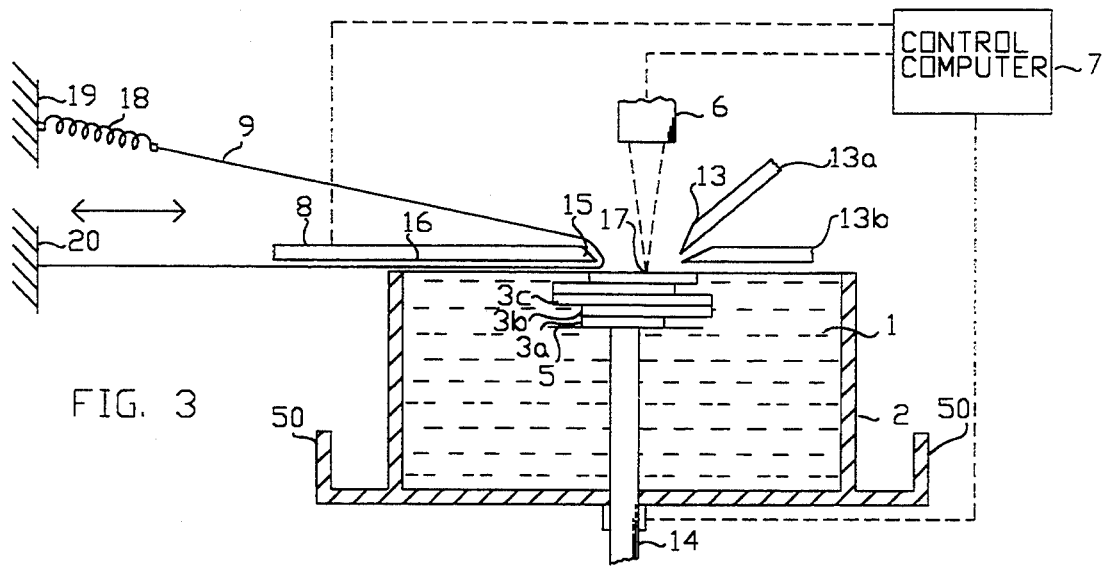
FIG. 3 is a cross-sectional view of a variant of the FIG. 1 embodiment.

Another embodiment of the subject invention is illustrated in FIG. 3, in which compared with FIGS. 1-2, like elements are identified with like reference numerals. In this embodiment, a spring (instead of a weight) is used to keep the film taught against the plate, and then peel the film off the resin surface when the plate is being retracted. As illustrated, one end of film 9 is tied to spring 18 which, in turn, is tied to stationary point 19. The plate has a beveled edge 15 and a flat surface 16. The film is threaded around the beveled edge of the plate and underneath the plate whereupon it is tied to stationary point 20. The spring will extend when the plate is being moved across the surface, and will thereafter contract to automatically peel the film off the surface while the plate is being retracted.

A significant aspect of the embodiments illustrated in FIGS. 1-3 is beveled edge 15 of the plate. As mentioned earlier, when the plate is retracted, some resin may stick to the film as it is peeled off the resin surface, and means such as air blade 13 or scrapers could optionally be added to push this resin back into the vat. It has been found that another way to minimize any resin which sticks to the film is to bevel plate edge 15 in a manner to be described subsequently.

Figure 4:
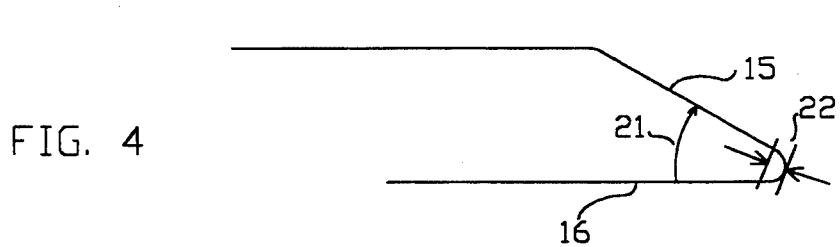
FIG. 4 is a cross-sectional view of the beveled end of the plate in the FIG. 3 embodiment.

The beveled edge is illustrated in FIG. 4, which shows edge 15 inclined at an angle 21 with respect to surface 16. Additionally, the radius of curvature of the beveled edge is indicated by identifying numeral 22. Preferably, angle 21 should be about 90 degrees or less, and radius 22 should be about the film thickness. Therefore, for a film thickness of 2 mils, the radius of curvature should also be about 2 mils.

Figure 5:
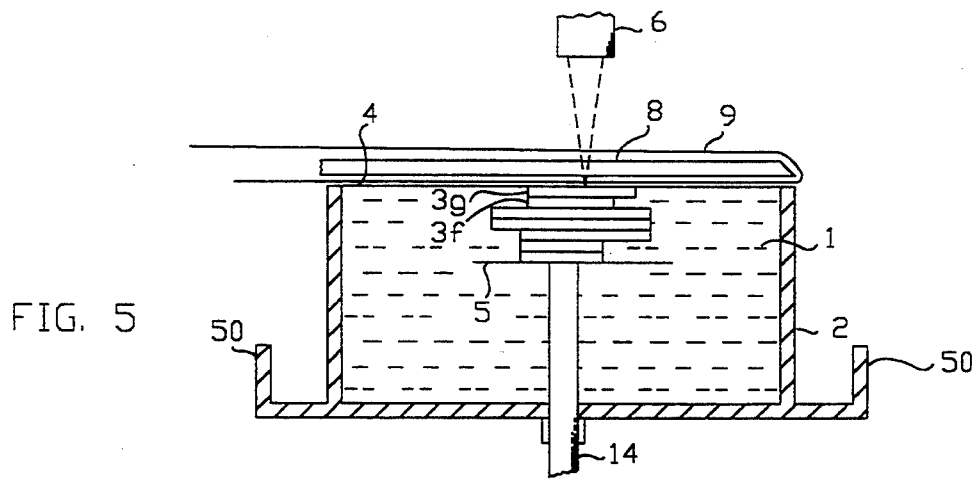
FIGS. 5–10 are cross-sectional views of embodiments of the subject invention at various stages in the formation of a flat working surface.

The operation of these embodiments will now be explained with reference to FIGS. 5–9, in which compared with FIGS. 1–3, like elements are identified with like reference numerals. The operation begins with the curing of layer 3g as illustrated in FIG. 5. It is assumed that the plate has been moved in place to create a flat working surface 4 for the creation of layer 3g, that layer 3g has a predetermined thickness, and that previous layer 3f has been placed at the predetermined thickness of layer 3g from the working surface. As indicated, UV light source 6 is directed to trace out layer 3g, applying a particular exposure which results in an appropriate cure depth and therefore automatic adhesion to layer 3f.

Also, as illustrated, the UV exposure of working surface 4 is assumed to take place through the plate and the film. In this instance, as discussed above, the plate should preferably be substantially transparent to the synergistic stimulation used. The materials discussed earlier for use in making the thin film, including TEFLON, MYLAR, epoxy, or the like, will also be substantially transparent to UV light as long as the thickness of the film is kept within the range indicated earlier.

Figure 6:
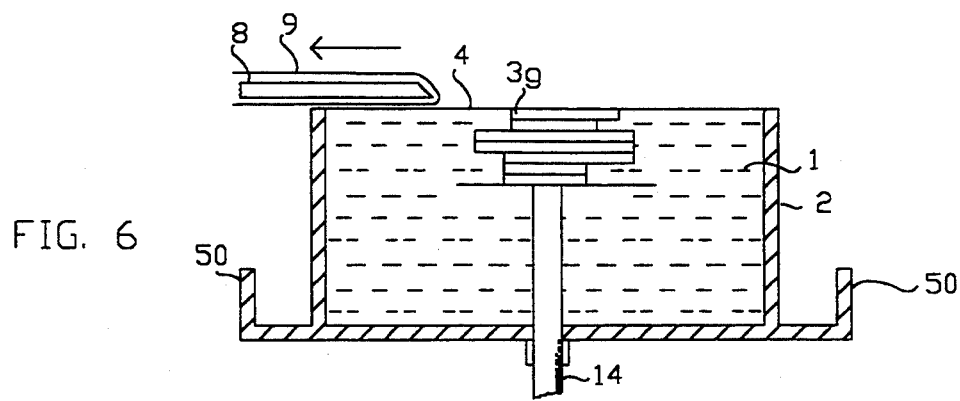

After layer 3g is cured, the plate is retracted as illustrated in FIG. 6. The retraction of the plate and associated peeling of the film is necessary to separate the cured resin from the film with minimal force applied to the part itself and therefore minimal distortion of the part. Thereafter, layer 3g can be lowered beneath the surface, and so that fresh resin can easily flow over this layer in preparation for curing the next layer.

Figure 7:
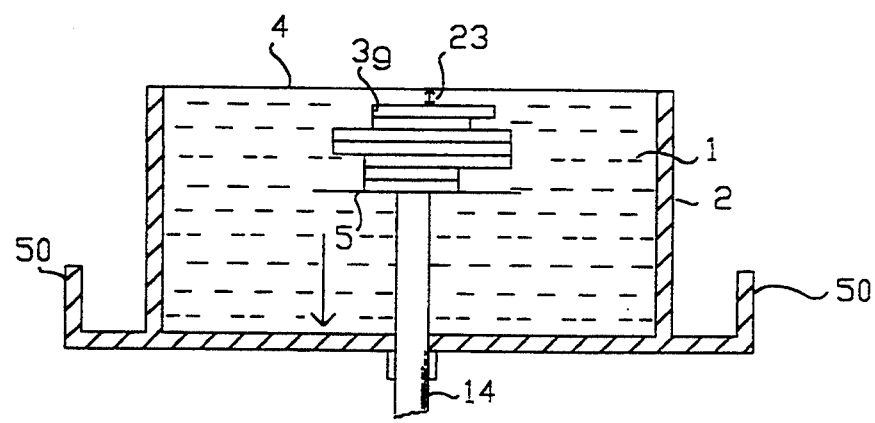

Then, as illustrated in FIG. 7, elevator 14 will be directed to lower layer 3g a particular distance 23 below the working surface. Typically, the next layer to be formed will have a predetermined thickness, and preferably, distance 23 will be greater than the predetermined thickness so that fresh resin will rapidly flow over layer 3g. If layer 3g were only lowered by the predetermined thickness, the surface tension and viscosity of the resin may prevent it from rapidly flowing over layer 3g.

Figure 8:
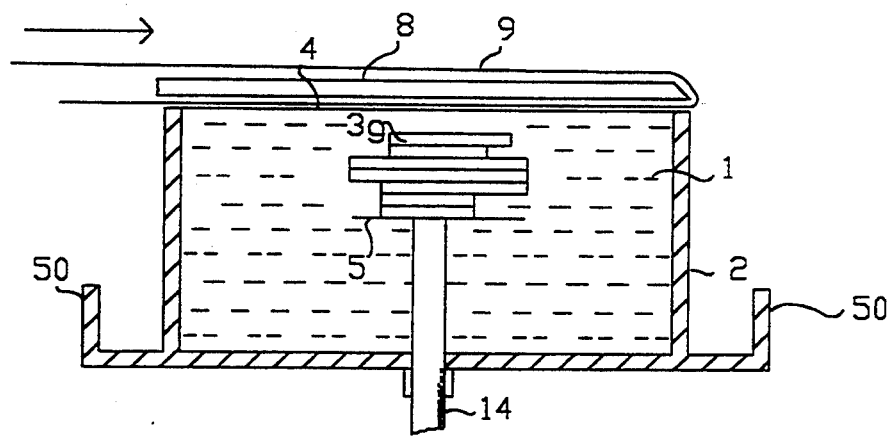
Figure 9:
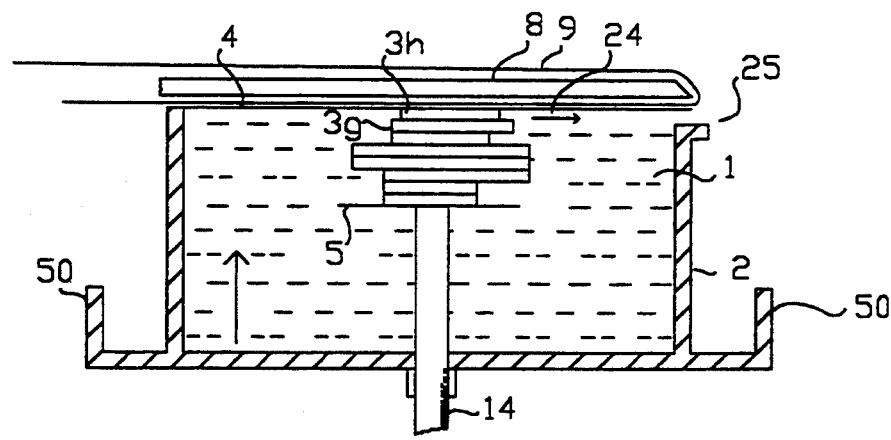

In FIG. 8, the plate is then positioned so that it substantially covers the working surface. Then, in FIG. 9, the elevator is directed to move layer 3g upwards to the predetermined thickness of the next layer, layer 3h, of the working surface. As a result, excess resin will be forced out of the space between layer 3g and the covered plate surface, which excess resin is identified by reference numeral 24 in the figure. As a result, it may be necessary to add resin spillway 25 to provide means for any excess resin to flow out of the vat. Alternatively, the plate could be retracted slightly to provide a space for the excess resin to flow to. As before, reservoir 50 may be added to catch this excess resin.

The movement of layer 3g upwards will force resin horizontally out from between 3g and the surface of the plate which defines the working surface and thereupon remove any air bubbles or voids between the resin surface and the film covered plate surface to form a flat working surface for the formation of layer 3h. The curing of layer 3h will then take place in a similar manner to that shown in FIG. 5 for layer 3g.

In another embodiment of the subject invention, UV exposure does not take place though the plate and the film. Instead, the covered plate is retracted before exposure takes place. In effect, the steps illustrated in FIGS. 5 and 6 are reversed, in that the retraction step illustrated in FIG. 6 takes place before the curing step illustrated in FIG. 5. As indicated earlier, liquid resin may stick to the film as it is peeled off, and an air blade or scraper may be added to force this excess resin back into the vat. Also, in this instance, the film and the plate material need not be transparent to the synergistic stimulation.

Figure 10:
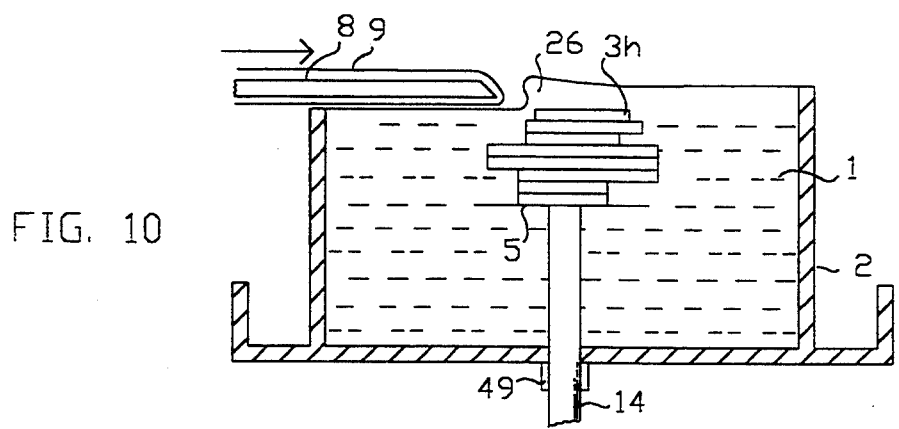

Another embodiment of the subject invention is illustrated in FIG. 10. In this embodiment, after the platform has been lowered as in FIG. 7, instead of the plate thereafter being moved across the resin surface as in FIG. 8, the platform is moved upwards as in FIG. 9, so that the upper surface of 3g is located at a distance below the working surface equal to the desired layer thickness for the next layer. Then, the plate is moved across the surface as illustrated in FIG. 10 to push off any excess resin, identified with reference numeral 26 in FIG. 10, with the covered edge of the plate. In effect, the steps illustrated in FIGS. 8 and 9 in the previous embodiment are reversed. This embodiment functions similarly to a leveling blade, except that the surface area of the plate should be large enough to sufficiently cover the resin surface as the plate is being pushed out over the resin surface. This will help avoid the problem of excess resin simply flowing underneath the plate to areas where the plate does not contact the resin surface, instead of being pushed off the surface. Because this embodiment exerts less force on the part than the previously described embodiments of FIGS. 5–9, it is preferred over those embodiments.

With respect to all the above embodiments, for acceptable results, the plate should be pushed out across the resin surface at a speed in the range of about 1/10 to 10 in/sec, depending on layer thickness, amount of excess resin to be removed, and part geometry. Also, as discussed above with respect to all the above embodiments, the plate should contact the liquid resin over a sufficiently large surface to prevent excess resin from simply flowing underneath the plate, instead of being pushed off the resin surface. A key aspect of all the above embodiments is that the film, while it is being removed from the resin, remains stationary with respect to the resin surface except along the thin line where film peeling occurs. In contrast, if the film were attempted to be slid or lifted off of the resin surface, the film would not remain stationary with respect to the resin surface during removal, and removal correspondingly would be more difficult since the force keeping the film and resin together would be much larger and therefore removal would be more likely to damage the part being formed. Peeling the film, on the other hand, only requires overcoming the force at the point where peeling is occurring at a given moment, which will only be at the line across the film where separation is occurring, instead of at the entire film surface. Also, if a scraper is used with these embodiments, preferably, it should be placed within one layer thickness of the film, and most preferably within about one-half layer thickness. In addition, it should preferably be as close to the resin surface as possible. If an air blade is used, its location relative to the plate should be based on the air pressure used, and its ability to remove resin from the film without disturbing the resin surface.

Figure 11:
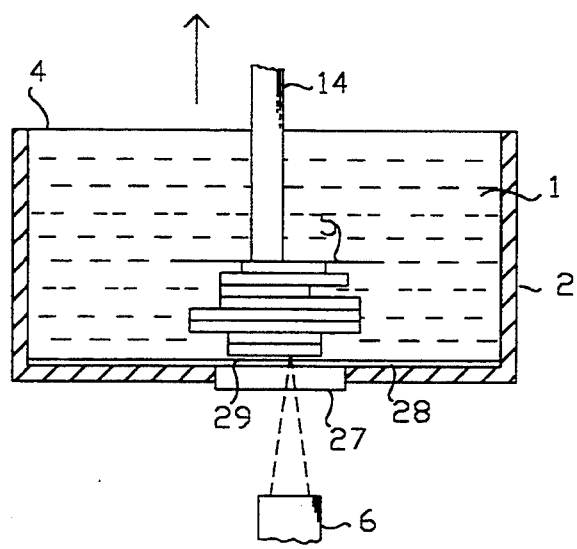
FIGS. 11–12 are cross-sectional views of an embodiment of the subject invention employing the bottom of a vat as the rigid member.

Another embodiment of the subject invention is illustrated in FIG. 11 in which, compared with previous figures, like elements are identified with like reference numerals. A key aspect of this embodiment is using the bottom of the vat as the rigid plate. As illustrated, the bottom of the vat comprises rigid flat plate 27. Another aspect of this embodiment is building the part from the top down instead of from the bottom up as with previous embodiments. This is illustrated by the order in which the layers are shown formed, with layer 3a shown as the most recently formed layer. A third aspect of this embodiment is the placement of UV light source 6 (or other appropriate synergistic stimulating means) underneath the bottom of the vat so that exposure takes place through the plate 27. In this embodiment, fresh resin is caused to flow over the previous layer by hydrostatic pressure, so overdipping may not be required. A fourth aspect is the formation of layers at working surface 29 (which is also the interface of the resin with the vat bottom) instead of surface 4 as with the previous embodiments. To prevent sticking of the cured resin to the plate, non-sticking substance 28 is provided to substantially cover the flat plate surface. This substance may simply be a thin epoxy, MYLAR, or TEFLON film as used in the previous embodiments, or may be made of TEFLON FEP or TETRATEX. Alternatively, this substance may be an inert liquid of the type described in co-pending U.S. patent application Ser. No. 365,444, referred to earlier. In addition to the inert liquids disclosed there, it has been found that an inert liquid such as FOMBLIN, or a prefluorinated liquid such as AFLUNOX, will be acceptable. Alternatively, a very thin non-stick coating applied to the plate made of a material such as trichlorosilane, ethoxysilane, or the like will be acceptable. Other non-sticking substances are possible. The main requirements are that the substance be smooth in order to inhibit mechanical adhesion with the resin (which could occur with a non-smooth material having surface interstices if the resin is allowed to flow into these interstices), and that it also inhibit chemical adhesion with the resin. As discussed above, the use of a TEFLON film or a plate impregnated with ethoxysilane or trichlorosilane will accomplish that. With respect to FIG. 11, when the platform is raised, the non-sticking substance should be such that the most-recently formed layer 3g will easily detach from the covered plate so that fresh resin can flow under this layer at working surface 29 in preparation for curing the next layer. In the case where the non-sticking substance is a film, the film should be peeled off of the resin as discussed above with the other embodiments.

Figure 12:
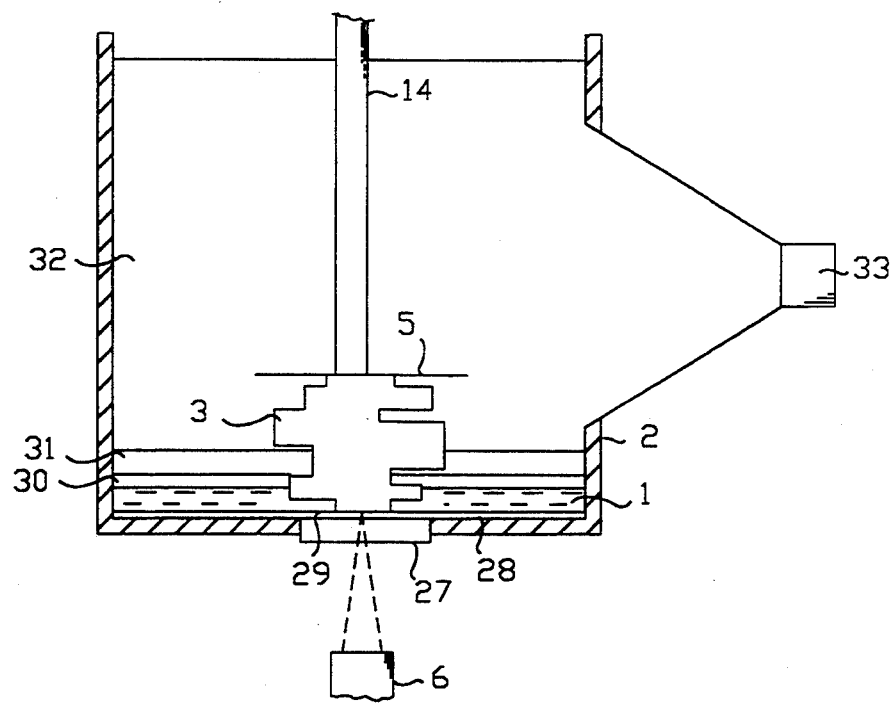

Another key aspect of the upside down embodiment of FIG. 11 is that it provides means for integrating other stereolithographic functions, such as part cleaning and post-curing, into part-building. This aspect is illustrated in FIG. 12, in which compared with FIG. 11, like elements are identified with like reference numerals. To integrate other stereolithographic functions into the SLA, a layer 30 of a UV-masking substance is provided to prevent UV light from UV light source 33 from reaching resin 1. The specific gravity of this substance is below that of the resin so it will float on the resin. In addition, a layer 31 of a resin stripping substance, immiscible with the UV-masking substance, is also provided having a specific gravity lower than that of the UV masking layer. Then, as the part is built up layer by layer, the layers will pass through the resin stripping substance, and can thereby be cleaned. More information about appropriate resin stripping substances is provided in "INTEGRATED STEREOLITHOGRAPHY," referenced earlier. Also, a volume 32 of a heat conductive, UV-transparent, inert liquid is also provided. This liquid has a lower specific gravity than the resin stripping substance so it will float on the substance. Examples of possible inert liquids are described in "INTEGRATED STEREOLITHOGRAPHY". Also provided is UV light source 33 for flooding the built layers with UV light and post-curing them while they are immersed in the inert liquid in a similar manner to that described in U.S. Pat. No. 5,076,974, referenced earlier.

Figure 13:
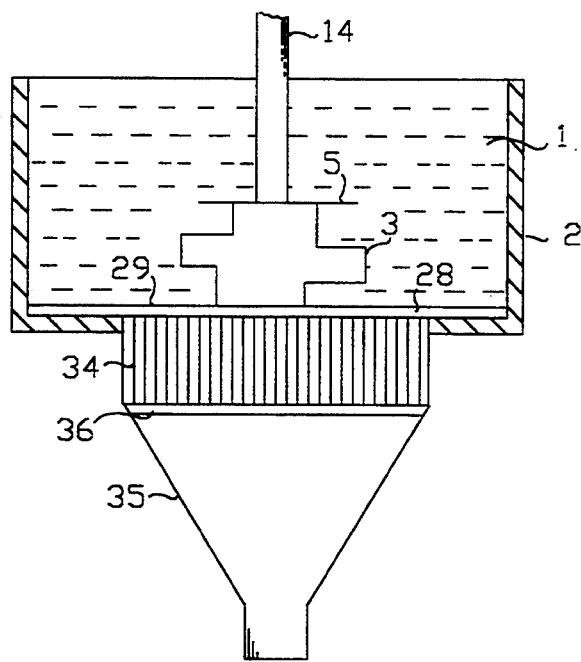
FIG. 13 is a cross-sectional view of an embodiment employing the face of a CRT as the rigid member.
Figure 19:
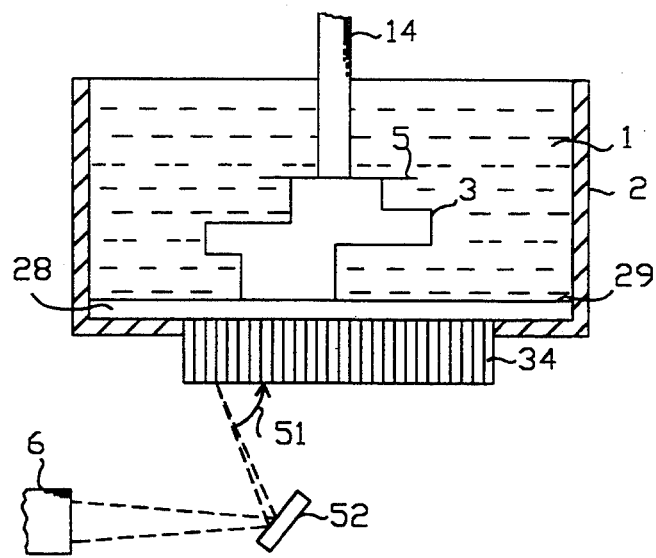
FIG. 19 is a cross-sectional view of an embodiment employing the face of a fiber-optic face plate as the rigid member.

A variant of the FIG. 11 embodiment is illustrated in FIG. 19. A significant aspect of this variant is the elimination of the "shingle" effect which can occur when the light source in FIG. 11 uses scanning mirrors (as opposed to an X-Y movement of a vertically directed light beam) to direct the solidifying radiation to areas at the periphery of the vat. In this instance, the light beam will impinge on the resin surface mostly at an angle other than ninety degrees. As a result, resin will be cured at these same angles, giving rise to a roughness of part surface known as the shingle effect. To overcome this, the rigid plate may consist of a coherent, fused fiber-optics bundle 34 which collects light at one surface over a range of incidence angles 51 from scanning mirrors 52 and transmit it to the opposite surface adjacent to non-sticking substance 28, which substance may be a thin film or the like as discussed above. Another variant of this embodiment is illustrated in FIG. 13, which shows an application of the fiber-optic technique to an imaging system based on a cathode ray tube (CRT). Here, CRT 35 generates an electron beam which strikes phosphorescent area 36, which in turn emits light, and the light then travels down the fiber optic bundle to strike the surface 29 at a right angle.

Figure 14:
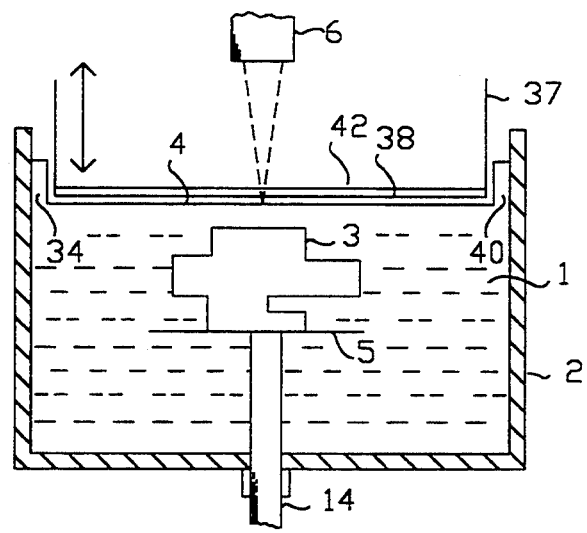
FIG. 14 is a cross-sectional view of an embodiment where the rigid member is the bottom of a compressive piston.

Another embodiment of the subject invention is illustrated in FIG. 14. A significant aspect of this embodiment is the use of a compressive piston 37 having a rigid flat surface 42 substantially covered with a substance such as an inert liquid or film of the type discussed earlier. The piston is moveable up and down, and after excess resin has flowed over a previous layer of the part, the compressive piston is lowered until the working surface of the resin is the proper distance from the previous layer. The piston may be slightly displaced from the sides of the vat as indicated by the reference numerals 39 and 40, respectively, to provide spillways where excess resin can flow as the piston is lowered. After the piston has been lowered, exposure may take place from UV light source 6 through surface 42 of the piston, as illustrated. After exposure, the piston is then raised to allow fresh resin to flow over the cured resin. The substances should be such that covered surface 42 easily removes itself from the cured resin at the working surface when the piston is raised. In the case where the substance is a film, after the piston is raised, the film may be peeled off as discussed earlier with respect to the other embodiments.

Figure 15:
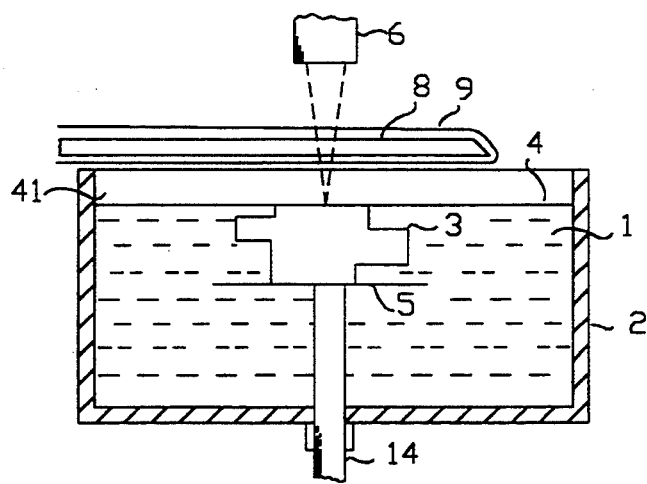
FIG. 15 is a cross-sectional view of an embodiment where the covering substance is an inert liquid.

Another embodiment is illustrated in FIG. 15. In this embodiment, an inert substance 41 is provided between the covered plate and the working surface to provide an additional means for preventing resin from sticking to the covered plate. In fact, the inert substance may be sufficient to prevent the resin from sticking to the plate, in which case film 9 could be eliminated. However, compared with the use of an inert liquid, the film may have the advantage that it may be easier to remove from the resin through the action of peeling as discussed earlier. Another advantage is that the film will remain stationary with respect to the resin surface while an inert liquid could move horizontally with respect to the resin surface. Hence, in the case of film, there is no surface friction, no horizontal motion of liquid, and no horizontal force transmitted to the part. Thus, in the case where horizontal forces may cause the part to distort, it may be desireable to continue to use the film as the mechanism to prevent the plate from sticking.

The main requirement of the substance besides it being inert, is that in liquid form it have a specific gravity sufficiently lower than that of the resin such that the liquid floats on the resin. For a resin having a specific gravity of about 1.2 g/ml, for example, an inert liquid having a specific gravity of about 1.0 g/ml or less will be appropriate. Other preferable characteristics of the liquid is that it be nonwetting, so that it will therefore not bead or form bubbles. In addition, the liquid should preferably be immiscible and insoluble in the resin so that the two materials remain separate. Several examples of possible inert liquids are described in "INTEGRATED STEREOLITHOGRAPHY," referenced earlier. Another requirement is that if curing of layers is to take place by exposure through the liquid, the liquid must be substantially transparent to the synergistic stimulation used.

Alternatively, the inert substance could be a wax, such that a layer could be cured through the wax while the wax is in solid form. Then, to release the working surface to enable fresh resin to flow over the surface for the formation of the next layer, and also optionally to release the plate in the case where the plate is retracted before exposure of the next layer, the wax would be heated into a liquid. With the wax in the form of a liquid, the platform (and the just cured layer) could be over-dipped as described earlier, and in addition, the plate could optionally be retracted. Otherwise, this embodiment will operate as described earlier with the other embodiments.

As an alternative to covering the plate with a film, an inert liquid, or thin coating, the interface between the plate and the working surface could be saturated with oxygen or other chemical inhibitor to inhibit the resin from curing, and therefore sticking to the plate. Alternatively, a porous plate could be used which would allow oxygen from the atmosphere to saturate the working surface with oxygen. This approach will be even more effective in combination with a peeling film.

Figure 16:
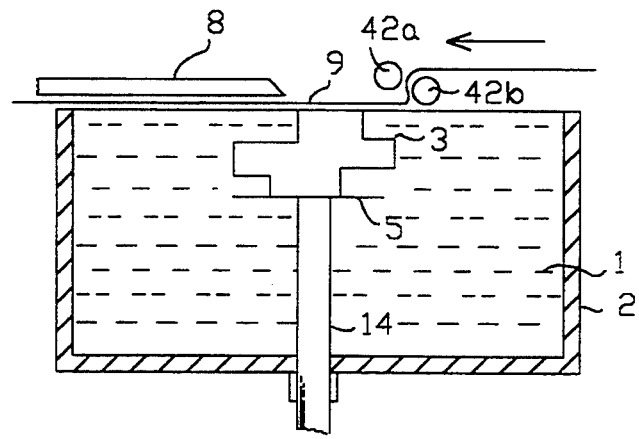
FIG. 16 is a cross-sectional view of an embodiment where the covering substance is a thin film, and rolling pins are used to peel away the film off the resin.

Another embodiment of the subject invention is illustrated in FIG. 16, in which like elements are identified with like numerals to those of previous embodiments. A key aspect of this embodiment is the method of peeling thin film 9 off of the resin surface. After a layer has been cured, optionally by exposing it through plate 9 and film 8, the plate is retracted, but the film is left in place. Then, the platform could be down-dipped, and the assembly of roller pins, identified with reference numerals 42a and 42b, would be moved from right to left as indicated to peel off the film. The part can be dipped down to overcoat the last layer with resin in excess of the desired layer thickness, then brought back to one layer thickness below the working level, or the part can be dropped to exactly one layer thickness, and resin will then flow in from the sides to insure coating of the part. After this has been accomplished, the plate would be moved back out across the film from left to right to form a flat working surface. Alternatively, the plate could be moved out from left to right in the wake of the roller pins to flatten the working surface. Otherwise, this embodiment will operate as described above with the other embodiments.

As will be apparent from the foregoing description, the subject invention provides significant benefits such as a guaranteed flat surface for the formation of a multi-layer stereolithographic part and a reduced recoating time. In addition, the invention recoats layers in a manner which is substantially independent of part geometry, and which minimizes any distortive effects therefrom on previous layers.

Another advantage of the subject invention is that it may reduce part shrinkage. Part shrinkage occurs because resins typically used to make stereolithographic parts shrink when they are cured. This can be a problem with coating methods that attempt to lay down exactly one layer thickness of fresh resin for coating previous cured layers, as opposed to overcoating followed by reducing the thickness.

Figure 17A:
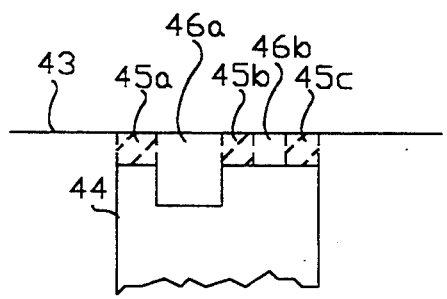
FIGS. 17a–17d are diagrams illustrating the shrinkage problem associated with uniformly deposited layers.

The shrinkage of the resins is described in more detail in co-pending U.S. patent application Ser. No. 339,246, referenced earlier. Because of resin shrinkage, if a just-cured layer is covered with a uniform coating of fresh uncured resin of thickness equal to the layer thickness in anticipation of curing the next layer, the result would be a nubbed working surface because of shrinkage of the cured portions of the previous layer. Simply laying down a uniform layer of fresh resin in preparation for curing the next layer would not guarantee a smooth working surface for formation of the next layer. The shrinkage problem can be illustrated with respect to FIGS. 17a–17c, in which like elements will be referred to with like reference numerals. FIG. 17a illustrates partially-formed part 44 placed below liquid resin surface 43 in preparation for the formation of the next layer of the part. Areas 45a, 45b, and 45c are to be exposed and therefore solidified, while areas 46a and 46b are to be left unexposed.

Figure 17B:
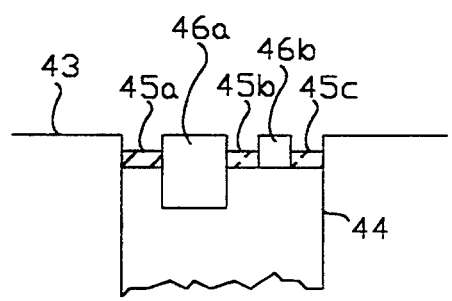

After exposure of the next layer, the situation illustrated in FIG. 17b results. As shown, because of shrinkage, the cured resin at areas 45a, 45b and 45c is below the surface 43 of the liquid resin, while the liquid resin at uncured areas 46a and 46b remains at that level. A nubbed appearance results, because of the shrinkage of the solidified portions of the part. This shrinkage directly causes several problems. The first problem is that of inaccurate part formation. Next, at some point, the nubs will collapse, creating a liquid layer thicker than expected, and therefore a possible loss of adhesion. Third, loss of surface level position may ensue, resulting in an additional loss of accuracy, and an out-of-focus condition for the UV laser or the like.

Figure 17C:
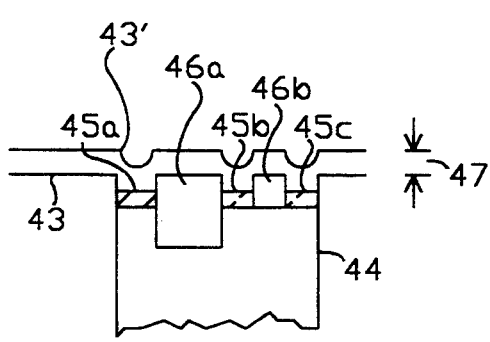

If a layer of fresh resin having a uniform thickness is placed over surface 43 in preparation for the curing of the next layer, as illustrated in FIG. 17c, the nubbed appearance will remain. FIG. 17c shows a layer of resin having uniform thickness 47 placed over surfaced 43 to create a new surface, identified with reference numeral 43'. As shown, surface 43' still has a nubbed appearance.

Figure 17D:
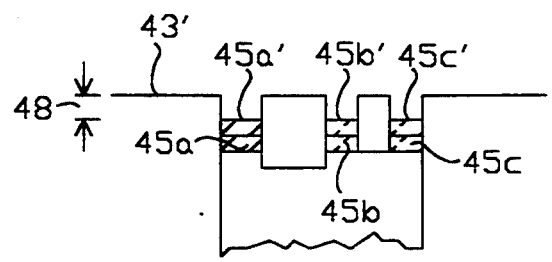

If uncorrected, this problem may get worse over time since the effects of shrinkage may accumulate. After the next layer in FIG. 17c is cured, for example, assuming the areas of that layer above areas 45a, 45b and 45c are the only areas exposed, shrinkage will again occur, which will add to the shrinkage which occurred on the previous layer to result in a part having the appearance shown in FIG. 17d. As shown, the newly cured material is identified with reference numerals 45a', 45b', and 45c'. The total amount of distortion of the solid portions of the part, identified with reference numeral 48, has increased. The nubbed working surface should be smoothed out before the next layer is cured. The subject invention will accomplish that.

The subject invention also overcomes the problem of trapped volumes. The trapped volume problem can be illustrated with respect to FIGS. 20a–20c, in which like elements are identified with like reference numerals. The trapped volume problem may occur in the case when a part is being built which encapsulates a trapped volume of uncured resin. In this instance, when a leveling blade is moved over the resin surface, pushing excess liquid resin ahead of it, and leaving a smooth working surface in its wake, when the blade encounters a trapped volume, the excess liquid resin may flow underneath the blade, and disrupt the formation of the flat working surface being formed in the wake of the blade.

Figure 20A:
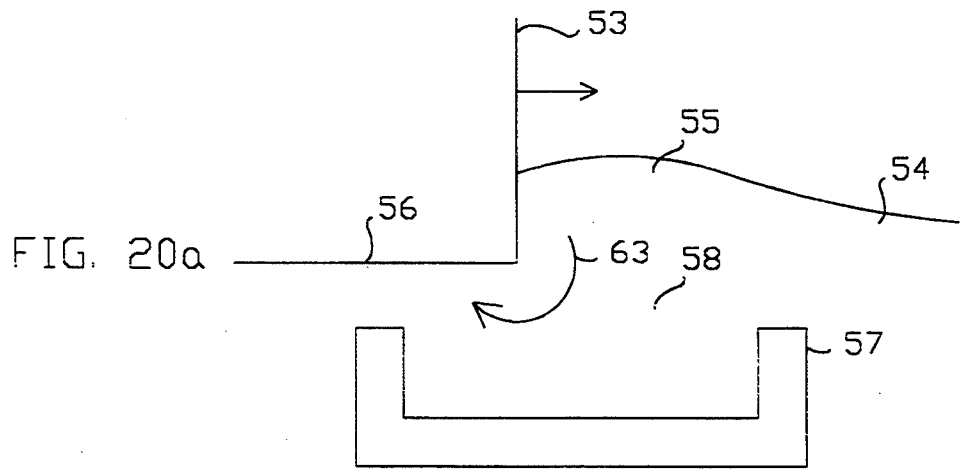
FIGS. 20a–20c illustrate the trapped volume problem.
Figure 20B:
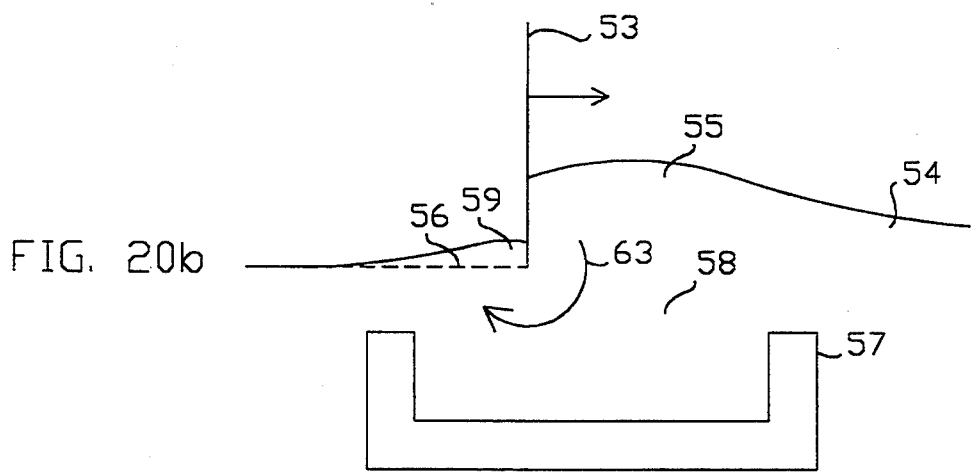

FIG. 20a shows partially built part 57 with trapped volume 58 immersed in liquid resin 54 while leveling blade 53 is being moved across the resin surface from left to right in preparation for forming the next layer. A volume of excess resin, identified with reference numeral 55, has formed in front of the blade, and is being pushed away by it to leave flat working surface 56 in the wake of the blade. When the trapped volume is encountered by the blade, some of this excess resin may move underneath the blade, as indicated by reference numeral 63. (While the leveling blade is moving over solid portions of the submerged part, on the other hand, the movement of this excess resin will be restricted.) The result is shown in FIG. 20b, which illustrates how the movement of this resin may disrupt the formation of the working surface, which disruption is identified with reference numeral 59.

Figure 20C:
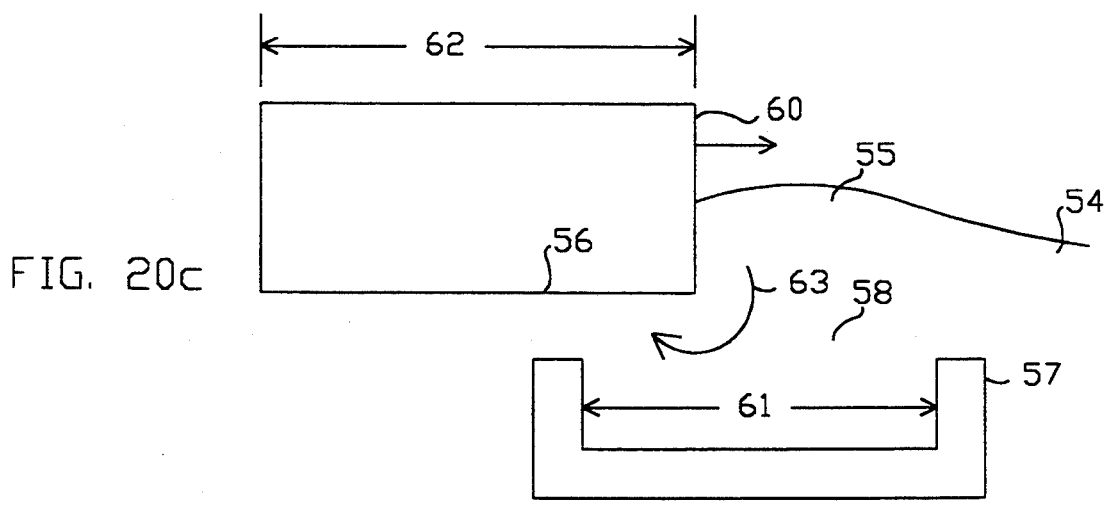

The subject invention will eliminate or minimize the disruption, as illustrated in FIG. 20c. As shown, member 60, rather than blade 53, is being moved across the resin surface when the trapped volume is encountered. Here, the length of the member will restrict the movement of the excess resin identified with reference numeral 63, and the formation of flat working surface 56 will not be disrupted. As can be seen, this will be the case as long as the length of the member, identified with reference numeral 62, is greater than the length of the trapped volume, identified with reference numeral 61. In any case, the subject invention also encompasses the use of rigid members other than plates, such as bars or the like, as long as the length of the member is greater than the horizontal length of a trapped volume which may be encountered in the formation of a typical part.

Figure 21A:
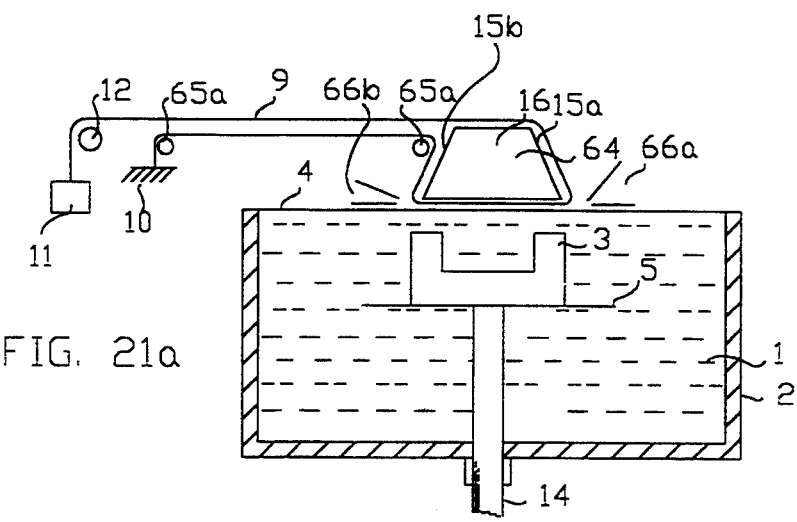
FIGS. 21a–21d illustrate an embodiment of the subject invention employing a bar instead of a plate.
Figure 21B:
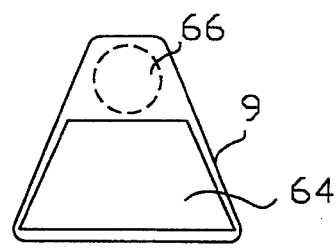
Figure 21C:
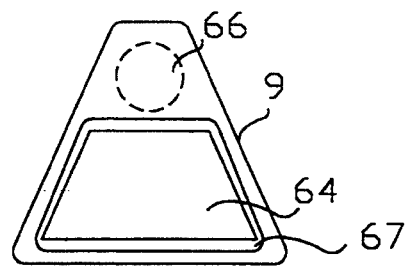

An embodiment of the subject invention embodying these principles is illustrated in FIGS. 21a–21c, in which compared with previous embodiments, like elements are identified with like reference numerals. A key aspect of this embodiment is the use of bar 64 instead of plate 8. As illustrated, the bar has a flat surface 16 having a length longer than the length of a trapped volume in a typical part. The surface is substantially covered by film 9 which, as with earlier embodiments, has one end attached to weight 11, wrapped around dowel 12, and then around the bar. As shown, the bar has two beveled edges, 15a and 15b, and the film is wrapped around both edges. The beveling of both edges of the bar enables the bar to be moved in either direction across the resin surface to smooth it out. The film is then wrapped around pins 65a and 65b, as shown, and then tied to fixed location 10. Alternatively, as before, the film could be tied to a spring, motor, or other source of tension. Also shown are optional air blades (or scraping blades) 66a and 66b for keeping excess resin from sticking to the film. A variant of this embodiment is shown in FIG. 21b, which shows film 9 wrapped around bar 64. As the bar moves across the resin surface, the film is rotated around the bar by means of motor 66.

Because liquid resin may enter any spacing between film 9 and bar 64, and foul the smooth movement of the film across the bar surface, it may be necessary to add rubber O-ring or spacer 67, as shown in FIG. 21c, to help prevent liquid resin from flowing into this space.

Figure 21D:
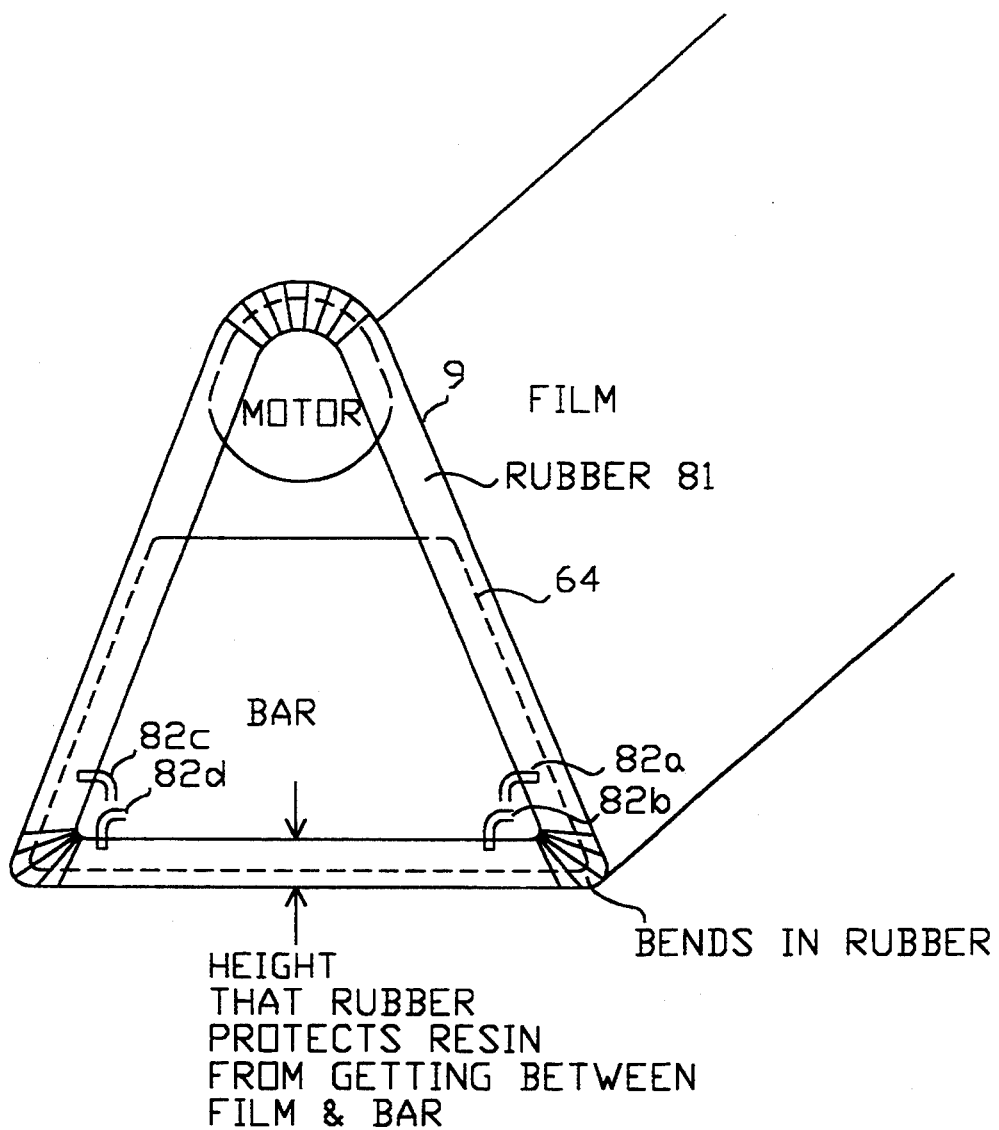

Alternatively, instead of O-rings, a rubber strip could be affixed to each side of the film. These strips should be of such width that the strip, when folded, will keep resin from flowing between the bar and the film. As illustrated in FIG. 21d, in which compared with previous figures, like elements are referred to with like reference numerals, rubber strip 81 is affixed to a side of film 9. The strip is of such a width so that when folded, the strip stops resin from flowing between film 9 and bar 64. Optionally, tabs 82a, 82b, 82c, and 82d could be added to the bar to force the rubber strip to bend around the contour of the bar.

Figure 22A:
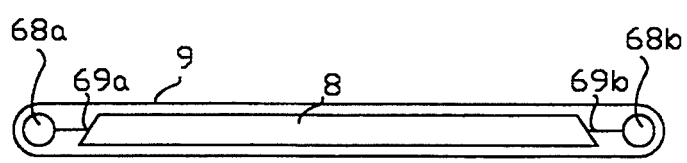
FIGS. 22a–22b illustrate an embodiment where springs are used to keep the film taut against the plate.

A variant of the above embodiments using a plate is shown in FIG. 22a, which shows dowels 68a and 68b attached to plate 8 by means of springs 69a and 69b. Film 9 is wrapped around the plate and attached dowels as shown.

Figure 22B:
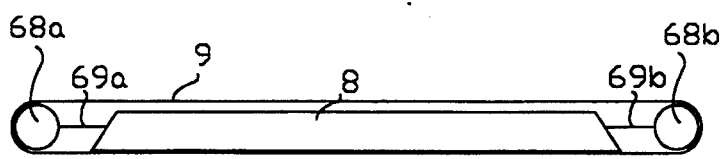

The springs act to keep the film taut against the surface of the plate. In FIG. 22a, the springs are shown compressed, to enable the film to be easily placed around the plate and attached dowels. Then, as shown in FIG. 22b, when the springs are allowed to expand, the film is made taut. The covered plate shown in FIGS. 22a–22b can then be moved across the resin surface to form a flat working surface as described in the earlier embodiments. The dowels can be placed in a variety of positions so that sharp bending angles of the film can still be maintained.

Figure 18:
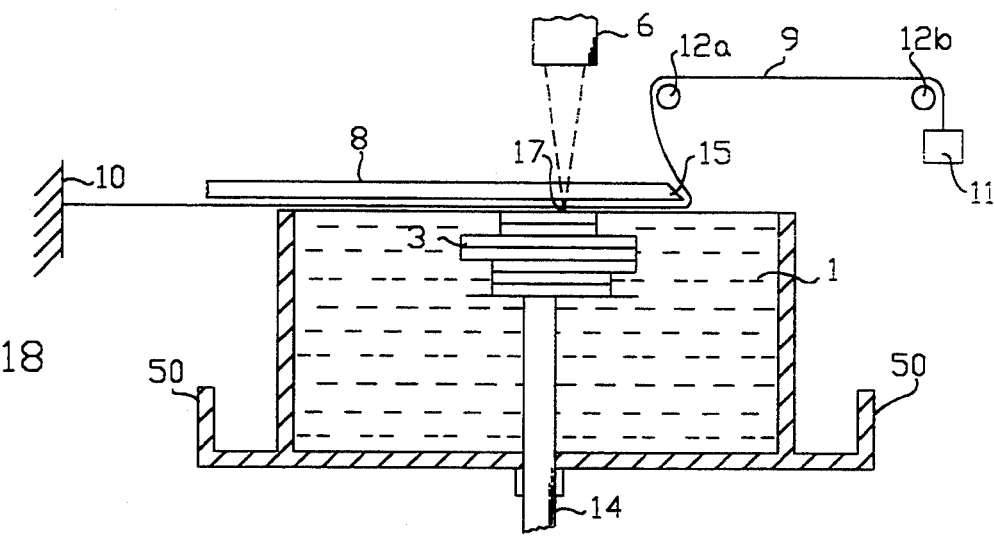
FIG. 18 is a cross-sectional view of an embodiment which avoids the problem of exposing through the thin film twice.

Another embodiment of the subject invention is illustrated in FIG. 18, in which like elements are referred to with like reference numerals. A key aspect of this embodiment is the method of applying tension to film 9 to keep it taut against substrate 8. As illustrated, film 9 is wrapped underneath the substrate, then around beveled end 15, then around dowels 12a and 12b whereupon it is attached to weight 11. As shown, the other end of the film is attached to stationary point 10. The key advantage to this embodiment is that after the plate has been moved across the resin surface, in the case where exposure is to be accomplished through the plate, exposure need not occur through the thin film twice, as per several of the other embodiments, but only once.

Several other advantages of the subject invention will be readily apparent. For example, the subject invention provides means for forming very thin layers since the thickness of supported portions of a layer, that is portions of a layer which are adjacent to cured portions of a previous layer, will be determined by the distance between the previous layer and a better controlled working surface. Viscosity of the resin will be a less important determinant of layer thickness.

In addition, it may be less necessary to control the level and flatness of the exposed surface of the resin in the vat, or even, in some embodiments, to keep this surface horizontal, since the placement of the member will control these parameters for the critical working surface. In effect, the member provides means to make the working surface more independent of vat constraints. Also, it may be less necessary to precisely control the distance between the source of the UV laser beam and the exposed surface of the resin as presently required to keep the laser beam in focus at the surface and ensure that an image, if projected by rotating mirrors, is the correct size. Instead, the location of the working surface can be precisely controlled through placement of the member. Another advantage is that any disruption to the exposed surface of the resin caused by displacement of the elevator, and any change in the level of this surface caused by shrinkage of the resin through curing or temperature changes, can be easily compensated for.

The member material may also conduct heat away from the working surface. As explained in "STEREOLITHOGRAPHIC CURL REDUCTION," referenced earlier, the generation of heat during curing may be a source of a distortion known as curl, which may occur when surrounding resin reacts releasing chemical energy, thereby heating the material and causing it to expand. The distortion may occur when the resin cools down after it has been adhered to cured resin on a previous layer. The cooling down of the resin will cause it to shrink, thereby increasing the potential of distortion of the previous layer by exerting a bending moment on it. The action of the member in conducting away heat generated by curing may therefore reduce curl.

The present invention may also reduce curl that results from the shrinkage which results when resin is cured. Reduction in shrinkage may occur since the resin as it cures will adhere to some extent to the plate/film, which adhesion may limit the ability of the resin to contract as polymerization occurs, which may make fluid flow into shrinking areas more likely, thereby reducing shrinkage related curl. In other words, this invention may make constant volume curing more likely than the traditional approach.

Another benefit of the invention is that it may reduce a distortion known as birdnesting, which occurs when cured resin is allowed to float or curl horizontally at a working surface before it has been adhered to the rest of the part. Before it has been adhered, this cured resin may move due to the force of air, convection currents in the resin, or the like. This solidified material may even distort on its own until it is adhered due to forces exerted between strips of solidified material that contact each other. Birdnesting is described in more detail in U.S. Pat. No. 5,015,424, referenced earlier.

If a layer is cured by exposure through a substrate or film, as per several embodiments of the subject invention, the layer may partially stick or adhere to the member or the film. This adherence to the member may prevent the layer from moving before it is anchored to the previous layer, and may reduce the birdnesting problem.

To enable a layer to substantially cool (and shrink) prior to attachment to a previous layer, the layer could be cured through a technique known as multi-pass, according to which the layer would be progressively cured through multiple passes of a UV laser beam. The first few passes would lightly adhere the layer to the film-covered member, and then subsequent passes would adhere the layer more strongly to the previous layer of the part. Alternatively, instead of multi-pass, the layer could be lightly adhered to the member and then tacked to the previous layer at selected locations in a technique known as riveting. Multi-pass and riveting are described in more detail in U.S. Pat. No. 5,104,592, referenced earlier. Multi-pass techniques have traditionally been limited by the occurrence of birdnesting. As described above, the subject invention reduces this problem, thereby removing an impediment to the use of multi-pass techniques for curl reduction.

Since the subject invention may reduce curl and birdnesting, there may be less need for other techniques presently used to reduce these two distortions. As explained in U.S. Pat. No. 4,999,143, referenced earlier, supports are frequently used to reduce curl and birdnesting. Therefore, the subject invention may reduce the need for supports.

A primary benefit is that the subject invention may further eliminate the geometric dependence of recoating. At present, fresh resin takes longer to level over solid portions of the previous layer than it does over hollow portions. As a result, the leveling time required may vary significantly from layer to layer depending on the layer geometry. The subject invention eliminates this dependence, and allows a more uniform leveling time.

The subject invention will also reduce the dependence of the leveling time on the viscosity of the resin. As a result, thicker, more viscous resins may possibly be used which shrink less when cured. As a result, curl can be reduced. Higher viscosity resins also have the advantage that they may allow parts to be more fully cured during part building (since higher viscosity resins typically require less curing to become fully cured) so that they may require less post-curing, which is described in "METHODS FOR CURING PARTIALLY POLYMERIZED PARTS," referenced earlier, to be fully cured. An additional benefit is that after part building, the parts may have greater strength, with the result that these parts may distort less throughout subsequent processing steps such as part cleaning.

Oxygen is typically absorbed in the resin, and as explained in "METHODS FOR CURING PARTIALLY POLYMERIZED PARTS," referenced earlier, oxygen exposure may inhibit curing and therefore require greater exposure to cure the oxygen-exposed resin. For UV light of a given power, this means a longer exposure time. The subject invention, particularly in the case where exposure is performed through the member, may also have the advantage of cutting down the amount of new oxygen diffusing in to the resin at the curing site during exposure. The effect of this may be to speed up part building. Alternatively, oxygen intensification can be used advantageously to minimize adhesion between the film and solidified resin, depending on the particular circumstances.

The subject invention reduces the need for the platform to be perforated. At present, the platform is perforated to facilitate its movement through the resin for the purpose of obtaining reasonable recoating times for the first several layers. As a result, less complex platforms may be possible. Also, if the platform is not perforated, there may be less need for supports to space the part from the platform. Supports are presently used, in part, to separate a part from the platform to prevent it being marked with the perforation pattern, and to compensate for initial errors in working surface to platform distance. Elimination of perforations, therefore, may reduce the need for supports.

In addition to the above, other benefits associated with the FIG. 12 embodiment will be readily apparent to those skilled in the art (it is apparent that these benefits can also be made available in a right-side-up embodiment by a suitable choice of materials). In general, post-curing a built part will solidify any residual liquid trapped within the part, strengthen it and prevent it from distorting or curling more. By integrating post-curing into an SLA, post-curing of a part will be accomplished faster, and part handling will be reduced, with the result that there may be less opportunity for the part to distort. Moreover, only a portion of the part will be in a partially cured state during part building, so there may also be less sag. In addition, as is the case with FIG. 11 embodiment, the elevator can be supported centrally (versus as a cantilever) without any liquid-tight seal being required as with the other embodiments. In the FIG. 10 embodiment, for example, the liquid-tight seal is identified with reference numeral 49. With respect to the FIG. 12 embodiment, an additional benefit is a reduction of the amount of resin which may be required. As indicated, only a thin layer of resin may be required, with the bulk of the vat filled with inert liquid 32.

Additional advantages and modifications will readily be apparent to those skilled in the art. The invention in its broader aspects is not, therefore, limited to the specific details, representative methods, and illustrative examples shown and described. Accordingly, departures may be made from such details without departing from the spirit or scope of applicant's general inventive concept.

What is claimed is:

1. An improved method for stereolithographically forming a three-dimensional object from a curable resin which is transformable upon exposure to solidifying radiation, comprising the steps of successively forming layers of said curable resin at a desired working surface in preparation for forming layers of said three-dimensional object, successively transforming said layers of curable resin by selectively exposing said layers of curable resin to solidifying radiation to form said layers of said three-dimensional object, and repeating said steps of forming and transforming so as to buildup the three-dimensional object from a plurality of adhered layers, the improvement comprising the steps of:
    covering at least a portion of the curable resin with a film, having a thickness, located at the working surface;
    retracting the film from the working surface, without translation of the film along the plane of the working surface, by peeling the film from the working surface;
    exposing the curable resin at the working surface to solidifying radiation in a pattern to form a layer of the three-dimensional object; and repeating the covering, retracting and exposing steps a plurality of times to form a plurality of layers of the three-dimensional object.

2. An improved method for stereolithographically forming a three-dimensional object from a curable resin which is transformable upon exposure to solidifying radiation, comprising the steps of successively forming layers of said curable resin at a desired working surface in preparation for forming layers of said three-dimensional object, successively transforming said layers of curable resin by selectively exposing said layers of curable resin to solidifying radiation to form said layers of said three-dimensional object, and repeating said steps of forming and transforming so as to buildup the three-dimensional object from a plurality of adhered layers, the improvement comprising the steps of:
    covering at least a portion of the curable resin with a film, having a thickness, located at the working surface;
    retracting the film from the working surface, without translation of the film along the plane of the working surface, by peeling the film from the working surface at a trailing contact line of the film and the working surface wherein substantially the only force of separation experienced between the film and the resin occurs progressively along the trailing contact line;
    exposing the curable resin at the working surface to solidifying radiation in a pattern to form a layer of the three-dimensional object; and
    repeating the covering, retracting and exposing steps a plurality of times to form a plurality of layers of three-dimensional object.

3. The method of claim 2 wherein the step of covering the surface comprises the step of:
    progressively advancing a leading contact line between the film and the working surface of the resin by dispensing the film along the plane of the working surface wherein each portion of the film that contacts the working surface remains stationary with respect to each portion of the working surface.

4. The method of claim 3 wherein the substeps of progressively advancing and retracting comprise translating a rigid member having a surface in a plane parallel to a plane of the working surface and being translated along the plane parallel to the plane of the working surface thereby causing the film to be applied to and retracted from the working surface of the resin by a translational motion between the rigid member and the film without translational motion between the film and the resin at the working surface.

5. The method of claim 4 wherein the rigid member has a beveled edge around which the film is wrapped, which forms the leading contact line during the covering step and which forms the trailing contact line during the retracting step.

6. The method of claim 5 wherein the beveled edge forms an angle of less than 90 degrees.

7. The method of claim 6 wherein the film thickness is in the range of ½ to 5 mils.

8. The method of claim 7 wherein the beveled edge has a radius of curvature approximately equal to the thickness of the film.

9. The method of claim 8 wherein the layers of the three-dimensional object have a thickness which is greater than the thickness of the film.

10. The method of claim 2 comprising the additional step of scraping away, using a scraper, at least some of any residual resin from a portion of the film after peeling the portion of the film from the working surface.

11. The method of claim 10 wherein the scraper is located a distance from the film which is less than a layer thickness of the layers of the three-dimensional object being formed.

12. The method of claim 2 wherein the exposing step occurs after the covering step but prior to the retracting step.

13. The method of claim 2 wherein the exposing step occurs after the covering and retracting steps.

14. The method of claim 2 wherein the curable resin is a photopolymer and said solidify radiation is applied to the curable resin as a beam which is selectively scanned over the surface of the resin.

15. The method of claim 2 wherein the steps of covering and retracting occur simultaneously along different lines of the working surface.

16. The method of claim 2 comprising the step of forming a coating, prior to the covering step, which has, at least in part, a thickness greater than that of the layers being formed.

17. The method of claim 2 wherein the step of covering comprises the step of translating the film along a line perpendicular to the working surface and bringing the film into contact with the working surface.

18. An improved apparatus for stereolithographically forming a three-dimensional object from a curable resin which is transformable upon exposure to solidifying radiation, comprising means for successively forming layers of said curable resin at a desired working surface in preparation for forming layers of said three-dimensional object, means for successively transforming said layers of curable resin including means for selectively exposing said layers of curable resin to solidifying radiation to form said layers of said three-dimensional object, and means for repeatedly actuating the means for forming and the means for transforming so as to buildup the three-dimensional object from a plurality of adhered layers, the improvement comprising:

means for covering at least a portion of the curable resin with a film, having a thickness, located at the working surface;

means for retracting the film from the working surface, without translation of the film along the plane of the working surface comprising means for peeling the film from the working surface;

means for exposing the curable resin at the working surface to solidifying radiation in a pattern to form a layer of the three-dimensional object; and means for repeatly actuating the means for covering, the means for retracting and the means for exposing a plurality of times to form a plurality of layers of the three-dimensional object.

19. An improved apparatus for stereolithographically forming a three-dimensional object from a curable resin which is transformable upon exposure to solidifying radiation, comprising means for successively forming layers of said curable resin at a desired working surface in preparation for forming layers of said three-dimensional object, means for successively transforming said layers of curable resin including means for selectively exposing said layers of curable resin to solidifying radiation to form said layers of said three-dimensional object, and means for repeatedly actuating the means for forming and the means for transforming so as to buildup the three-dimensional object from a plurality of adhered layers, the improvement comprising:

means for covering at least a portion of the curable resin with a film, having a thickness, located at the working surface;

means for retracting the film from the working surface without translation of the film along the plane of the working surface, comprising means for peeling the film from the working surface at a trailing contact line of the film and the working surface wherein substantially the only force of separation experienced between the film and the resin occurs progressively along the trailing contact line;

means for exposing the resin at the working surface to solidifying radiation in a pattern to form a layer of the three-dimensional object; and means for repeatly actuating the means for covering, the means for retracting and the means for exposing a plurality of times to form a plurality of layers of the three-dimensional object.

20. The apparatus of claim 19 wherein the means for covering the surface comprises means for progressively advancing a leading contact line between the film and the working surface of the material including means for dispensing the film along the plane of the working surface wherein each portion of the film that contacts the working surface remains stationary with respect to each portion of the working surface.

21. The apparatus of claim 20 wherein the means for progressively advancing and the means for retracting comprise a rigid member having a surface in a plane parallel to a plane of the working surface and being translatable along the plane parallel to the plane of the working surface thereby causing the film to be applied to and retracted from the working surface of the resin by a translational motion between the rigid member and the film without a translational motion between the film and the resin at the working surface.

22. The apparatus of claim 21 wherein the rigid member has a beveled edge around which the film is wrapped, which forms the leading contact line and the trailing contact line.

23. The apparatus of claim 22 wherein the beveled edge forms an angle of less than 90 degrees.

24. The apparatus of claim 23 wherein the film thickness is in the range of $\frac{1}{2}$ to 5 mils.

25. The apparatus of claim 24 wherein the beveled edge has a radius of curvature approximately equal to that of the film thickness.

26. The apparatus of claim 25 wherein the layers of the three-dimensional object have a thickness which is greater than the film thickness.

27. The apparatus of claim 19 comprising means for scraping away at least some of any residual resin from a portion of the film after peeling the portion of the film from the working surface.

28. The apparatus of claim 27 wherein the scraper is located at a distance from the film which is less than a layer thickness of the layers of the three-dimensional object being formed.

29. The apparatus of claim 19 wherein the curable resin is a photopolymer.

30. The apparatus of claim 19 wherein the means for covering comprises means for translating the film along a line perpendicular to the working surface and bringing the film into contact with the working surface.

31. The apparatus of claim 19 wherein the means for exposing comprises a means for producing a beam of solidifying radiation which is selectively scanned over the surface of the resin.

* * * * *